May 3, 1955

A. G. THOMAS 2,707,361

LAWN TRIMMER

Filed June 10, 1952

INVENTOR.
Albert G. Thomas
BY

ATTORNEY

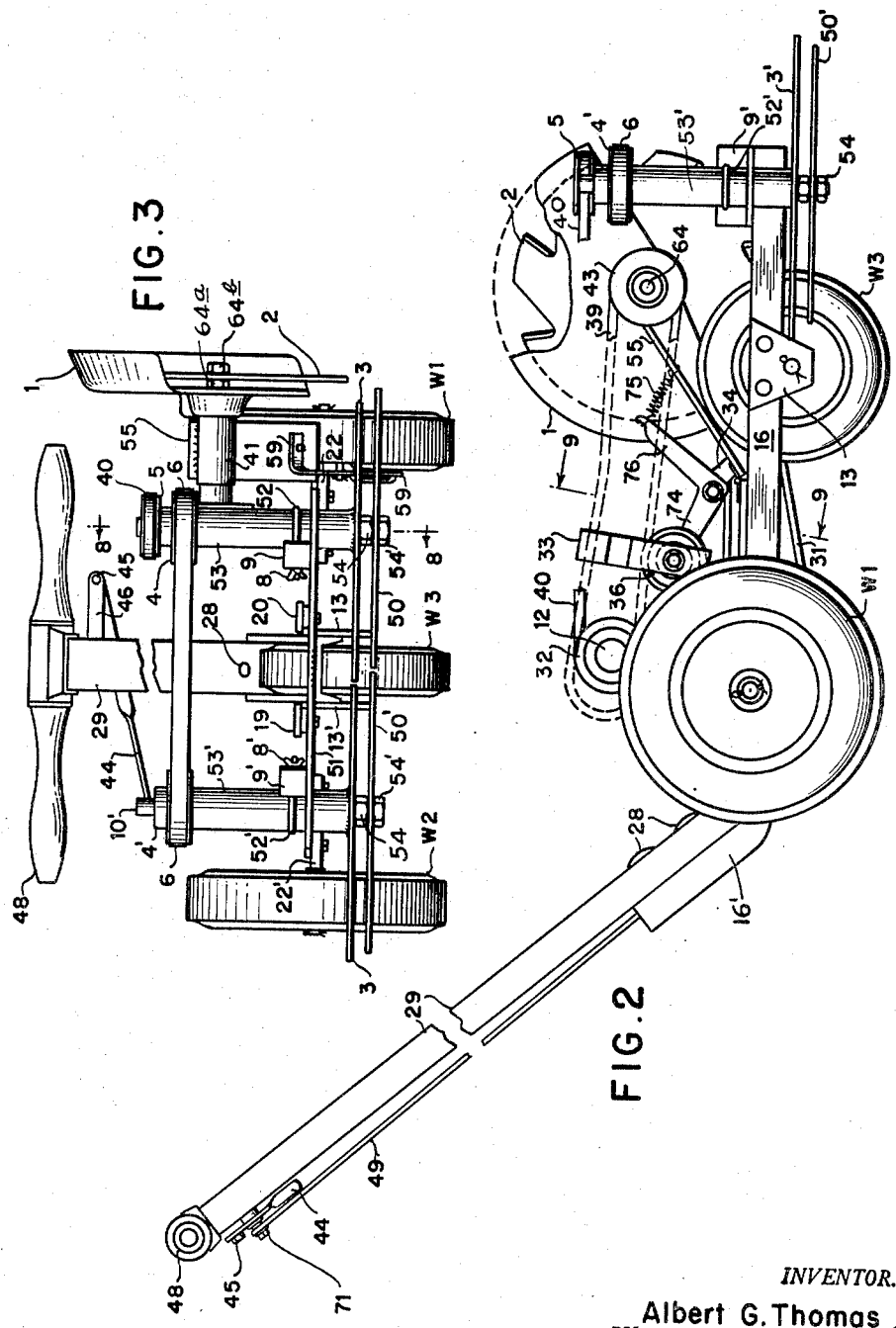

May 3, 1955  A. G. THOMAS  2,707,361
LAWN TRIMMER
Filed June 10, 1952
3 Sheets-Sheet 3
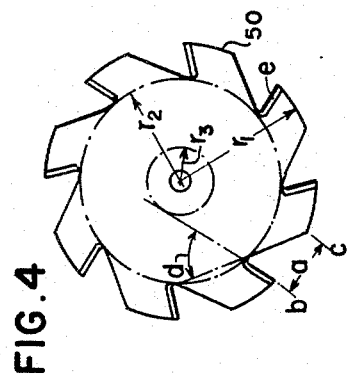
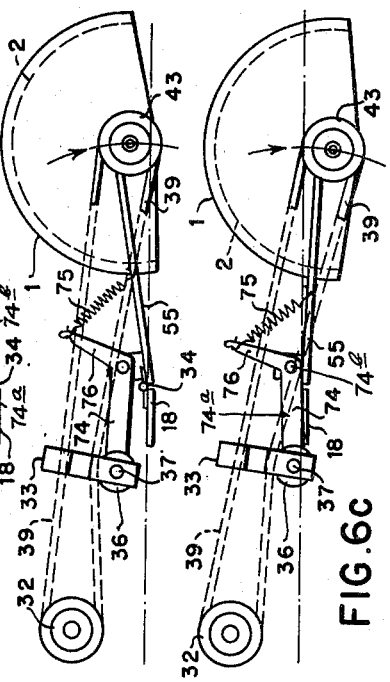
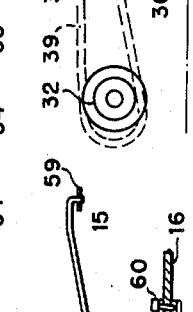
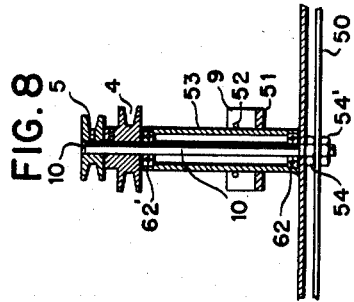
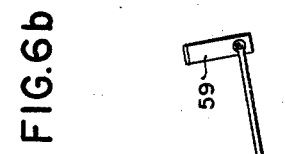
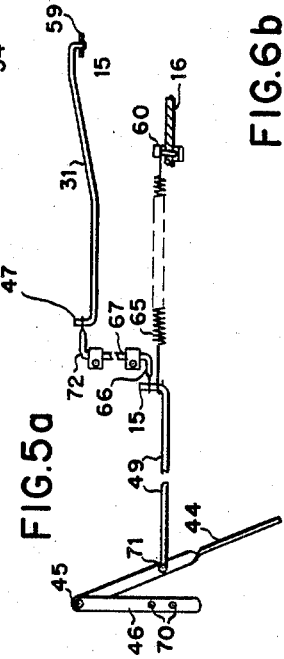
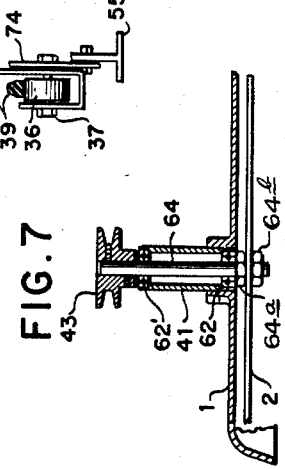
INVENTOR.
Albert G. Thomas
BY
ATTORNEY

United States Patent Office 2,707,361
Patented May 3, 1955

2,707,361

LAWN TRIMMER

Albert G. Thomas, Miami, Fla.

Application June 10, 1952, Serial No. 292,609

5 Claims. (Cl. 56—25.4)

This invention relates to lawn mowers and more particularly to power-driven lawn mowers and still more particularly to power-driven lawn mowers having disc-cutters rotating in a horizontal plane and has for its object the provision of a lawn mower of this type which is provided with an edger attachment that is movable into and out of operating position.

Another object is to provide a lawn mower of this type which is capable of performing the functions of mowing, edging and trimming the grass around sidewalks, driveways, flower beds, walls, trees, shrubs, etc., without the use of additional attachments or the necessity for making mechanical adjustment or resetting of the instrumentalities of the device.

Still another object is to provide an improved type of lawn mower.

Other objects will be apparent as the invention is more fully hereinafter disclosed.

In accordance with these objects I have designed and constructed a lawn mower having horizontally rotating grass cutting blades and a vertically rotating edger blade, which is movable into and out of edging position, in which by means of a third wheel mounted on the carriage the maneuverability of the mower is improved and the forward mounting of the cutting blades is facilitated and by the provision of an overlying guard means the said cutting and edger blades are protected against injury, all as will be apparent from the following disclosure of one specific embodiment of the device illustrated in the accompanying drawings, wherein:

Fig. 2 is a side elevational view;

Fig. 3 is a front elevation view;

Fig. 4 is a plan view of the edger blade;

Figs. 5a and 5b are diagrammatic views of the edger operating linkage;

Figs. 6a, 6b and 6c are enlarged elevational views of the edger arm and idler pulley assembly to show the means of applying and maintaining belt tension while the edger assembly is being raised and lowered;

Fig. 7 is a sectional view along plane 7—7 of Fig. 1;

Fig. 8 is a sectional view along plane 8—8 of Fig. 3; and

Fig. 9 is a view of the idler pulley assembly taken substantially along plane 9—9 of Fig. 2.

Figure 1:
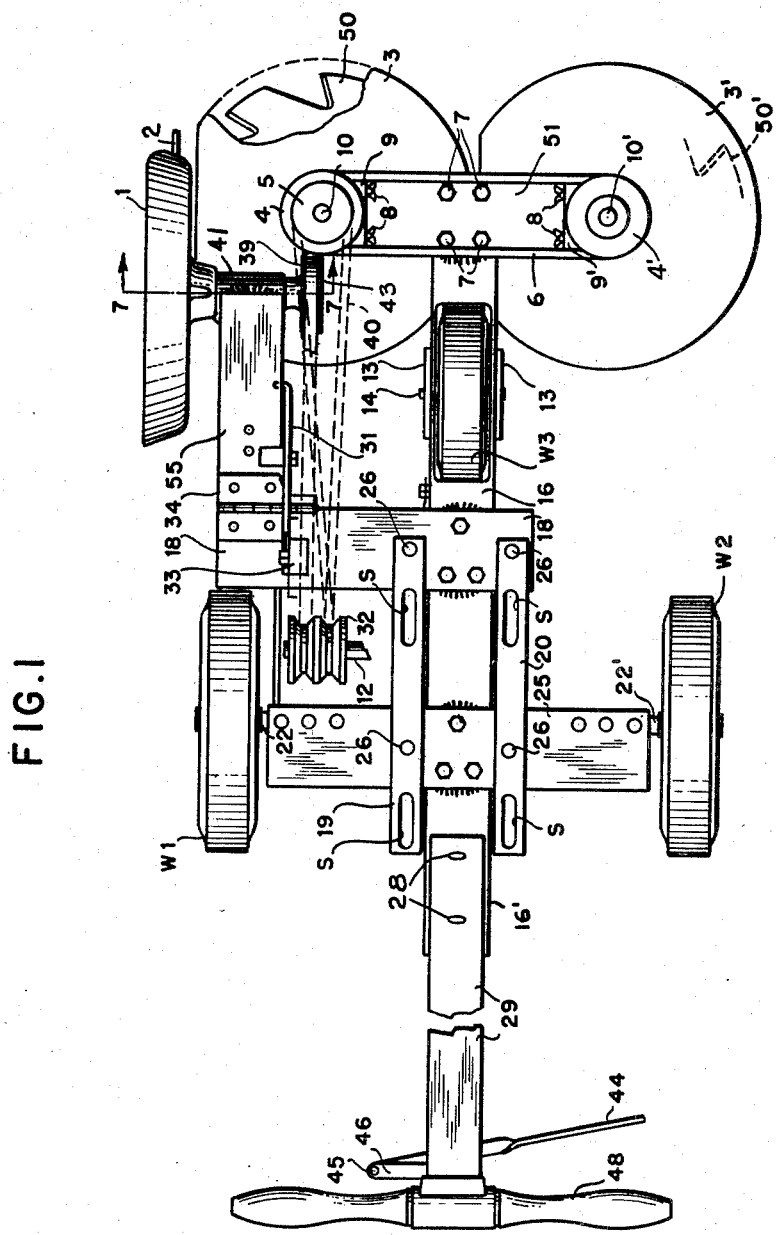
Fig. 1 is a top plan view with parts broken away showing the general arrangement of the component parts.

Referring to the drawings, the mower device of the present invention comprises a fabricated metal frame composed of an elongate longitudinal member 16 and central and rear cross members 18 and 25 respectively, forming a base on which is adapted to be mounted a prime mover (not shown), such as a gasoline engine or an electric motor of common design, which prime mover is secured in operative position with respect to the drive shaft 12 by means of the usual type of anchor bolts (not shown) which would be passed through the four slots S provided in the two mounting bars 19 and 20 which are secured to the cross members 18 and 25 of the frame by bolts 26. Stub axles 22, 22' are secured to each end of cross member 25 to sustain free rotating wheels $W_1$, $W_2$ which rest upon the ground and support the rear of the frame. The forward end of the longitudinal member 16 is provided with a longitudinally extending slot to accommodate therein a third wheel $W_3$ providing a forward support for the frame, said wheel $W_3$ also being freely rotatable on axle 14 sustained by steel support plates 13, 13' secured to opposite sides of the frame member 16.

A conventional type of mower handle 29 extending upwardly and rearwardly from the frame is secured to the upwardly bent rear end portion 16' of member 16 of the frame by carriage bolts 28 to provide the mower operator with means to maneuver the mower manually.

A third and forward frame cross member 51 is secured across the extreme forward end of longitudinal member 16 of the frame by four bolts 7. To this forward cross member the horizontally rotating cutting blades 50, 50' are secured by means of two cradle blocks 9, 9' welded to the ends of member 51, and drilled to accommodate U bolt clamps 52, 52' carrying wing nuts 8, 8'. Two substantially identical cutter assemblies (Fig. 8) are supported in the cradle blocks 9, 9' by the U bolt clamps 52, 52', as illustrated clearly in Fig. 3. Adjustment of the cutter assemblies for desired height in these mountings may be individually made by tightening wing nuts 8, 8' while the cutter assemblies are held in the desired position.

The identical cutter assemblies are formed as shown in cross-section in Fig. 8 and each consists of a tubular housing 53 or 53' which passes through an opening in cross frame 51 adjacent to one of the cradle blocks 9 or 9' welded thereon, which tubular housing is counter-bored at each end to receive sealed ball bearings 62—62' therein which rotatively sustain a steel shaft 10, 10' within the housing. Each of the shafts 10, 10' is threaded on its lower end to adapt it to secure a cutter blade 50 or 50' thereto by means of the two internally threaded nuts 54 and 54'. The upper end of the shaft 10 of the left hand cutter assembly has two V belt pulleys 4 and 5. Pulley 4 has trained about it a belt 6 which drives the right cutter assembly by being trained about a similar pulley 4'. Pulley 5 is encircled by belt 40 which engages around power delivery pulley 32 mounted on the drive shaft 12, which is connected to a prime mover, not shown, thereby operatively connecting the cutter blades 50—50' with the prime mover. A disc guard 3 is welded to the left housing 53 in protective overlying position to cutter blade 50 and an identical disc guard 3' is welded to the right housing 53' in similar protective overlying position to cutter blade 50'.

The dual V type pulley 32 on the power driven shaft 12 which is connected by belt 40 to drive pulley 5, also accommodates belt 39 which drives pulley 43 of the edger blade assembly shown in Fig. 7 to rotate shaft 64 of this assembly. As shown in Fig. 1 and Fig. 7 the shaft 64 has the pulley 43 mounted on its inner end. The outer end of shaft 64 is threaded and carries the edger blade 2 secured thereto between two internally threaded nuts 64a and 64b substantially as provided in the cutter assembly of Fig. 8. Shaft 64 rotates in two shielded ball bearings 62—62' mounted in the counterbored ends of tubular housing 41. The edger guard 1 is mounted on and encircles the outer end of the housing 41 so as to protect the operator from flying particles, and the outer periphery of this guard is shaped so as to deflect the particles substantially horizontally away from one side of the mower, substantially as shown in Fig. 1.

The edger shaft housing 41 is rigidly secured across the forward end of the edger assembly arm 55 which is pivoted by hinge 34 at its rear end to the frame cross member 18. The hinge 34 pivotally supports the edger assembly arm 55 so that it may be raised and lowered manually by the operator while the machine is in motion as will now be described.

To provide for the manual movement of the edger blade assembly into and out of operating positions a spring actuated means is provided to yieldingly hold the edger blade assembly in its upwardly swung non-operating position; a manually operated means is provided to move the assembly in opposition to the action of the spring actuated means into full operating position; and means is provided to interrupt the driving of the cutter blade of the assembly as it is returned to the operative position and to initiate driving of the cutter blade of the assembly as it moves out of the operative position and approaches full operating position. Referring to Figs. 5a and 5b and to Figs. 6a, 6b and 6c, the details of these means may be understood.

The spring urged means to hold the edger blade assembly normally out of its operating position consists of tension spring 65 which extends longitudinally of the machine and is connected at its forward end by means of bolt 69 to the rear end of the longitudinal member 16 of the frame. The rear end of the spring 65 is connected to the finger 15 at the forward end of link 49 the rear end of which is connected by a bolt 71 to the lever 44. This lever is pivotally secured by a bolt 45 on a bar 46 secured by bolts 70 to and across the mower handle arm 29 closely adjacent handle 48 at the end thereof. The position of the lever 44 relative to the handle 48 is such that the operator may readily grasp same and move the lever 44 towards the handle 48 in opposition to action of the spring 65 and hold the handle in its moved position while retaining a firm hold on the handle 48.

This movement of the lever 44 and the link 49 causes finger 15 to move the arm 66 of the rock shaft 67 to which it is linked, and thereby to rotate the rock shaft in its bearings, thereby causing the arm 72 at the opposite end of the shaft 67 to pull finger 47 of link 31, to which it is linked, to move the link 31 in the direction of movement of link 49. The opposite end of link 49 is secured to the arm 59 which is secured to the under surface of hingedly mounted arm 55 on which the edger blade assembly is mounted. It can therefore be seen that the movement of lever 44 towards the handle 48 results in movement of arm 55 downwardly towards the operating position against the action of spring means 65 holding the links 49 and 31 and the arm 55 in a position which locates the edger blade assembly in inoperative position.

It is apparent that when the edger blade assembly is in its raised or inoperative position, as shown in Fig. 6a, the belt 39 is slack and loosely engaged about pulleys 32 and 43 and that the rotary motion of the driven pulley 32 is not being transmitted by the belt 39 to the pulley 43. The means provided to hold the drive belt 39 in position over the pulleys 32 and 43 and to apply driving tension gradually to the belt 39 as the edger assembly on arm 55 is moved by link 31 from the position shown in Fig. 6a to the full operating position shown in Fig. 6c along the arcuate path indicated by arrows, consists of a guard 33 and roller 36 mounted on the end of the arm 74 of a spring controlled bell crank lever generally designated 74a and pivotally mounted at 74b on arm 55 to move therewith. The forward arm 76 of lever 74a has secured thereto an end of a tensioning spring 75, the opposite end of which spring is secured to the arm 55 forwardly of the bell crank lever. With this arrangement it is clear that when the arm 55 is in the position shown in Fig. 6a the spring 65 is under minimum tension and merely holds the roller 36 and the guard 33 in slack take-up and belt aligning position, respectively. To obtain flexibility of these elements the guard 33 and the roller 36 are both pivotally mounted on the arm 74 of the bell crank lever by means of the bolt 37. As the arm 55 moves downwardly to an intermediate position, such as is shown in Fig. 6b the removal of slack from the drive belt 39 causes the arm 74 of the bell crank to be depressed against the restraining action of the spring 75 with the roller 36 taking up any slack remaining and insuring initiation of the drive connection between pulleys 32 and 43 and driving of the cutter blade 2 in such intermediate position.

As the arm 55 is moved to fully depressed or full operating position, as shown in Fig. 6c, the bell crank 74a moves therewith and the arm 74 swings in opposition to the spring 75 with the pulley 36 still taking up any slack in the belt 39 to continue the driving of the edger blade 2.

On the reverse movement of arm 55 under the tension of spring 65, upon the release of lever 44 by the operator, the edger assembly returns automatically to the inoperative position shown in Fig. 6a, in which position the belt drive connection between pulleys 32 and 43 is broken.

As illustrated, the arm 55 is mounted on the cross member 18 of the frame to have its free end directed forwardly and such end is located in relatively close relation to and slightly rearwardly of the vertical shaft 10 on which the cutter 50 is mounted. The edger blade 2 is mounted on the outer end of the shaft 64, that is, the end of the shaft 64 which is remote from or directed outwardly from the vertical shaft 10. The edger blade is disposed in a vertical plane which, as is clearly shown in Fig. 3, passes across and in close proximity to the outermost peripheral portion of the horizontal cutter 50. Accordingly, it will be seen that when the vertical edger 2 is raised and lowered, it will pass across the outer edge of the horizontal cutter 50 in a plane at right angles to the latter and therefore these two cutters 2 and 50 may cooperate to simultaneously cut, one vertically along an edge and the horizontally up to such edge. Two complete cutting operations are thus performed at one and the same time.

Referring now to Fig. 4, the type of cutter blade employed for each of the cutter blades hereinabove identified as cutters 50, 50' and edger blade 2 is illustrated. The three blades are substantially identical and interchangeable. As indicated in this figure the cutting blade is substantially circular and has a plurality of teeth about its periphery, the total number of which teeth may be varied widely without essential departure from the invention. In the specific embodiment of cutter blade shown in Fig. 4, the thickness of the blade approximates $3/32$ inch; $r_1$ approximates 4½ inches; $r_2$ approximates 3¼ inches; and $R_3$ approximates 1⅛ inches. The cutting edge angle $e$ on each tooth approximates 30°, angle $d$ approximates 50°; and the distance $a$ between $b$ and $c$ approximates 2⅛".

It is believed apparent from the above description and the drawings illustrating one specific embodiment of the invention, that the mower device of the present invention is a manually propelled three-wheeled mower having power driven horizontally disposed rotating grass cutting blades, the said cutting blades being forwardly mounted on the three-wheeled carriage frame and provided with guard means protecting the cutting blades, the said device also having a vertically disposed rotatable edger blade mounted on one side thereof. The edger blade is provided with a protecting guard which is also designed to outwardly direct the debris thrown off therefrom and is also provided with means operative to manually move the edger blade from the spring urged inoperative position to an operative position and for driving the edger when in said operative position.

Many modifications and departures from the specific embodiment illustrated in the drawings will occur to those skilled in the art without essential departure from

What I claim is:

1. In a mowing machine, a wheel supported body frame, means for supporting a prime mover thereon, means for manually steering the machine, an arm pivotally connected at one end to the frame for vertical swinging on an axis perpendicular to the path of travel of the machine, said arm extending in the direction of forward travel of the machine, a stub shaft rotatably supported across the forward end portion of the arm, an edge trimmer disc secured to said shaft for rotation in a vertical plane, a pulley carried by said shaft, a power delivery pulley receiving power from the prime mover, a drive belt connecting said pulleys, means for swinging the arm about said axis for raising and lowering the edge trimmer disc, and means located beneath the belt and between the pulleys and carried by the arm to be raised and lowered thereby and operatively engaging said belt for tightening the belt to effectively start operative rotation of the edge trimmer disc after a predetermined extent of down swing of the arm and maintaining belt tightness through a predetermined further extent of down swing of the arm.

2. The invention according to claim 1, wherein the last means comprises a bell crank, means pivotally mounting the bell crank at the joined ends of the arms thereof to the pivoted arm to swing on an axis extending in a direction paralleling the first axis, a roller rotatably mounted on one crank arm below the belt and having the lower run of the belt riding thereover, a guard carried by said one crank arm and engaging over the upper run of the belt, and a pull spring connected between the end portion of the other crank arm and the first arm, said first arm in swinging down pulling the belt down against the roller to effect swinging of the bell crank about its pivot in a direction to tension the spring.

3. The invention according to claim 1, with a vertical rotary shaft supported on the body frame adjacent to the forward end of the arm, a cutting disc secured to the lower end of said vertical shaft for rotation thereby in a horizontal plane, said edgetrimmer disc being positioned to be moved in said plane in close proximity to and across the periphery of the first cutter whereby said cutters cooperate to simultaneously cut vertically along an edge and horizontally up to said edge, and means for transmitting rotary motion from the prime mover to said vertical shaft.

4. The invention according to claim 3, with means for changing the elevation of the horizontal cutter by raising and lowering the position of the vertical shaft, and means for releasably rigidly securing the vertical shaft in such position.

5. The invention according to claim 3, with a housing enclosing the major portion of the vertical shaft, said body frame having a portion formed to receive the housing and permit vertical movement of the latter, and means for changing the elevation of the horizontal cutter and securing the same with its shaft and housing comprising a cradle carried by the frame and having said housing resting therein and a securing element carried by the cradle and having clamping engagement with the housing and holding the housing against movement in the cradle.

References Cited in the file of this patent

UNITED STATES PATENTS

| | | |
|---|---|---|
| 2,188,110 | Fahnestock | Jan. 23, 1940 |
| 2,245,821 | Poynter | June 17, 1941 |
| 2,494,662 | Lind | Jan. 17, 1950 |
| 2,521,033 | Bell | Sept. 5, 1950 |
| 2,538,230 | Boggs | Jan. 16, 1951 |
| 2,585,405 | Reiter | Feb. 12, 1952 |
| 2,602,277 | Johnson | July 8, 1952 |
| 2,608,043 | Berdan | Aug. 26, 1952 |
| 2,618,919 | Hutchens | Nov. 25, 1952 |
| 2,622,384 | Velotta | Dec. 23, 1952 |
| 2,643,503 | Noyes | June 30, 1953 |
| 2,651,159 | Rountree, Sr. | Sept. 8, 1953 |